(12) United States Patent
Tanno et al.

(10) Patent No.: US 10,959,237 B2
(45) Date of Patent: *Mar. 23, 2021

(54) BASE STATION APPARATUS AND COMMUNICATION CONTROL METHOD

(71) Applicant: DENSO CORPORATION, Kariya (JP)

(72) Inventors: Motohiro Tanno, Yokohama (JP);
Yoshihisa Kishiyama, Yokosuka (JP);
Kenichi Higuchi, Yokohama (JP);
Mamoru Sawahashi, Yokohama (JP);
Toshifumi Sato, Tokyo (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,948

(22) Filed: Feb. 2, 2018

(65) Prior Publication Data

US 2018/0160434 A1  Jun. 7, 2018

Related U.S. Application Data

(63) Continuation of application No. 15/293,374, filed on Oct. 14, 2016, now Pat. No. 9,924,524, which is a
(Continued)

(30) Foreign Application Priority Data

May 10, 2007 (JP) ................................. 2007-126036

(51) Int. Cl.
*H04W 4/00* (2018.01)
*H04W 72/08* (2009.01)
(Continued)

(52) U.S. Cl.
CPC ..... *H04W 72/082* (2013.01); *H04W 72/1231* (2013.01); *H04W 72/1278* (2013.01); *H04W 92/20* (2013.01)

(58) Field of Classification Search
None
See application file for complete search history.

(56) References Cited

U.S. PATENT DOCUMENTS 6,445,917 B1  9/2002  Bark et al.
7,133,673 B2  11/2006  Zeira et al.
(Continued)

FOREIGN PATENT DOCUMENTS

CN  1371579 A  9/2002
EP  1229755 A2  8/2002
(Continued)

OTHER PUBLICATIONS

Chinese Office Action for Application No. 200880023648.3, dated May 4, 2012 (12 pages).
(Continued)

*Primary Examiner* — Bob A Phunkulh
(74) *Attorney, Agent, or Firm* — Harness, Dickey & Pierce, P.L.C.

(57) ABSTRACT

The object is achieved by providing a base station apparatus for performing time and frequency scheduling in uplink packet access with: an interference amount measurement part configured to measure an uplink interference amount for each interference amount measurement unit which comprises a predetermined period and a predetermined number of frequency blocks; an interference amount determination part configured to determine whether the uplink interference amount satisfies a predetermined condition; and an overload indicator reporting part configured to report an overload indicator to a neighboring cell when the predetermined condition is satisfied.

18 Claims, 9 Drawing Sheets

Related U.S. Application Data continuation of application No. 13/859,454, filed on Apr. 9, 2013, now Pat. No. 9,474,079, which is a continuation of application No. 12/599,512, filed as application No. PCT/JP2008/058094 on Apr. 25, 2008, now Pat. No. 8,451,792.

(51) Int. Cl.
*H04W 72/12* (2009.01)
*H04W 92/20* (2009.01)

(56) References Cited

U.S. PATENT DOCUMENTS

| | | | |
|---|---|---|---|
| 8,451,792 B2 | 5/2013 | Tanno et al. | |
| 8,483,743 B2* | 7/2013 | Dimou | H04W 16/02 370/319 |
| 9,474,079 B2 | 10/2016 | Tanno et al. | |
| 2002/0015393 A1 | 2/2002 | Pan et al. | |
| 2002/0102985 A1 | 8/2002 | Amalfitano et al. | |
| 2002/0119781 A1 | 8/2002 | Li et al. | |
| 2004/0092232 A1 | 5/2004 | Zeira et al. | |
| 2005/0220002 A1 | 10/2005 | Li et al. | |
| 2006/0234752 A1 | 10/2006 | Mese et al. | |
| 2007/0036067 A1 | 2/2007 | Zhang et al. | |
| 2007/0211672 A1* | 9/2007 | Song | H04B 1/7107 370/335 |
| 2007/0249363 A1 | 10/2007 | Amalfitano et al. | |
| 2008/0159323 A1* | 7/2008 | Rinne | H04L 1/0004 370/431 |
| 2008/0242301 A1 | 10/2008 | Osterling et al. | |

FOREIGN PATENT DOCUMENTS

| | | |
|---|---|---|
| EP | 1434364 A2 | 6/2004 |
| EP | 1453341 A2 | 9/2004 |
| EP | 1303928 B1 | 9/2005 |
| EP | 1802161 A1 | 6/2007 |
| EP | 1873925 A1 | 1/2008 |
| WO | 2006/103823 A1 | 10/2006 |
| WO | 2006/114873 A1 | 11/2006 |

OTHER PUBLICATIONS

Written Opinion from PCT/JP2008/058094 dated Aug. 5, 2008 (3 pages).
NTT Docomo, Inc. et al, "Transmission Power Control in E-UTRA Uplink"; 3GPP TSG RAN WG1 Meeting #48; R1-070870 (originally R1-070108); St. Louis, USA; Feb. 12-16, 2007 (8 pages).
Communication dated Sep. 23, 2014 from the European Patent Office in counterpart application No. 08740883.7.
3GPP TS 25.309, v6_6_0; 3rd Generation Partnership Project; Technical Specification Group Radio Access Network; DD Enhanced Uplink; Overall Description; Stage 2 (Release 6); Mar. 2006 (34 pages).
3GPP TR 25.814, v7.1.0; 3rd Generation Partnership Project; Technical Specification Group Radio Access Network; Physical Layer Aspects for Evolved Universal Terrestrial Radio Access (UTRA) (Release 7); Sep. 2006 (132 pages).
NTT DoCoMo, Inc. et al_, "Transmission Method of Overload Indicator for Inter-Cell Transmission Power Control in EUTRA Uplink"; 3GPP TSG RAN WG1 Meeting #49; R1-072418; Kobe, Japan; May 7-11, 2007 (2 pages).
NTT DoCoMo, Inc., "Investigations on Inter-cell Transmission Power Control based on Overload Indicator in E-UTRA Uplink"; 3GPP TSG RAN WG1 Meeting #48bis; R1-071634; St. Julians, Malta; Mar. 26-30, 2007 (17 pages).
International Search Report w/translation from PCT/JP2008/058094 dated Aug. 5, 2008 (2 pages).
Communication dated Jun. 6, 2018 from the European Patent Office in counterpart EP application No. 18170941.1.

* cited by examiner

BASE STATION APPARATUS AND COMMUNICATION CONTROL METHOD

CROSS REFERENCE TO RELATED APPLICATIONS

The present application is a continuation application of U.S. patent application Ser. No. 15/293,374 filed on Oct. 14, 2016, which is a continuation application of U.S. patent application Ser. No. 13/859,454 filed on Apr. 9, 2013, now U.S. Pat. No. 9,474,079, which is a continuation application of U.S. patent application Ser. No. 12/599,512 filed on Feb. 4, 2010, now U.S. Pat. No. 8,451,792, which is a national stage application of PCT Application No. PCT/JP2008/058094, filed on Apr. 25, 2008, which claims priority to Japanese Patent Application No. 2007-126036 filed on May 10, 2007. The contents of these prior applications are incorporated herein by reference in their entireties.

TECHNICAL FIELD

The present invention relates to a radio communication system. More particularly, the present invention relates to a base station apparatus and a communication control method.

BACKGROUND ART

3GPP that is a standardization group of the third generation mobile communication system is studying a communication scheme that becomes an evolved version of W-CDMA, HSDPA and HSUPA, that is, 3GPP is studying Evolved UTRA and UTRAN (Another name: Long Term Evolution or Super 3G, to be referred to as E-UTRA hereinafter) (refer to non-patent document 1, for example).

Different from W-CDMA and the like, E-UTRA realizes all packet access including radio sections. Especially, in the uplink, although the component of the packet access is introduced in HSUPA which is an evolved version of W-CDMA, HSUPA uses circuit switching type communication based on dedicated channels. Uplink access schemes are largely different between E-UTRA and earlier W-CDMA or HSUPA.

As main features, E-UTRA adopts all packetaccess, and adopts time/frequency packet scheduling. Thus, in each cell, mobile stations to which uplink radio resources are assigned are different for each TTI (Transmission Time Interval) and for each resource block (RB). As a result, the other-cell interference amount applied to neighboring cells due to uplink transmission in a cell largely varies every TTI and largely varies every RB.

Figure 1:
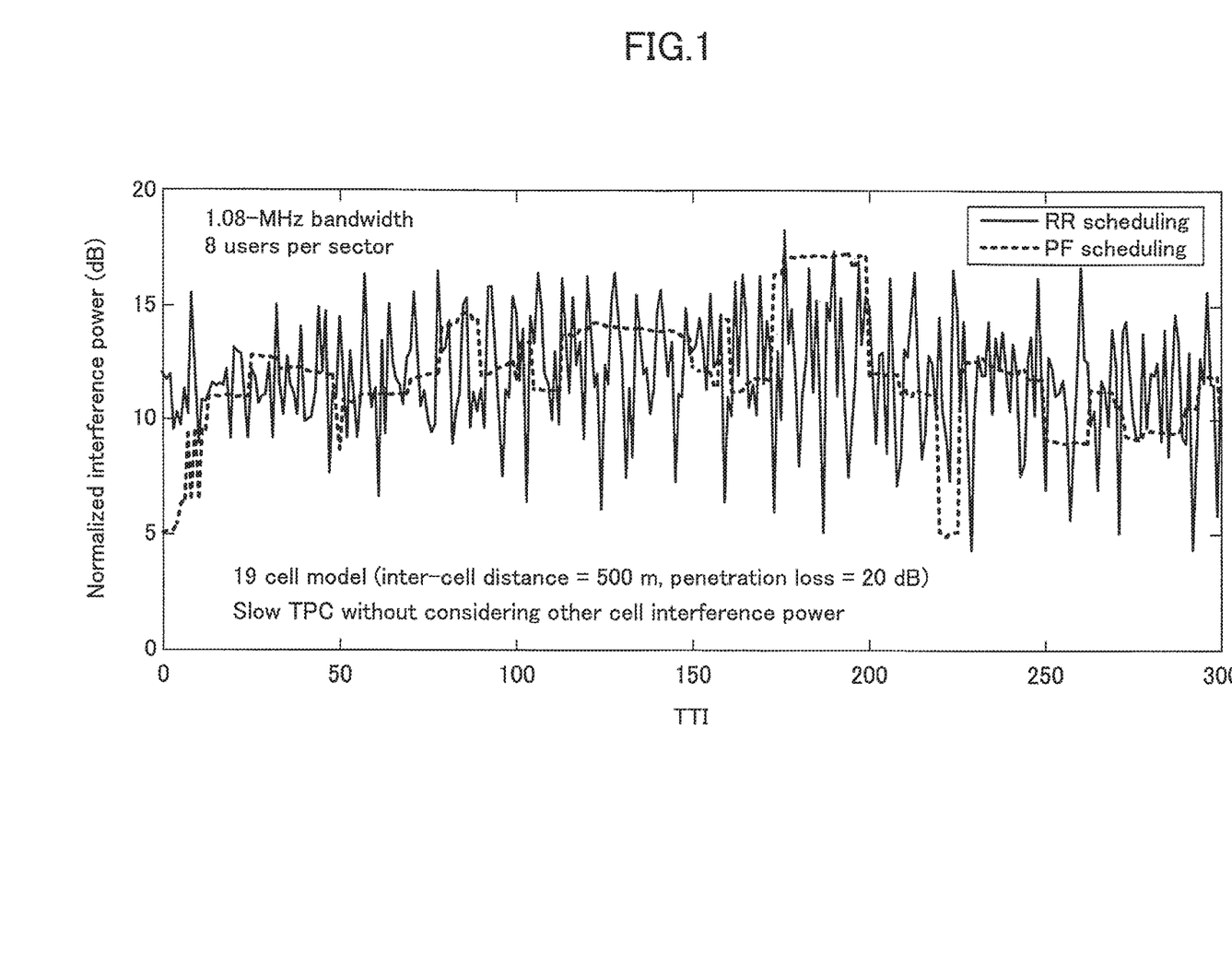
FIG. 1 is an explanatory diagram showing an example of variation of interference amount in each TTI.

FIG. 1 shows an example of variation of the interference amount for each TTI. In FIG. 1, the horizontal axis indicates TTI, and the vertical axis indicates normalized interference power, and FIG. 1 shows Round Robin (RR) scheduling and Proportional Fairness (PF) scheduling. As a result, in both of the scheduling schemes, the uplink SINR (Signal-to-Interference plus Noise Power Ratio) largely varies, so that communication quality deteriorates. Therefore, how the variation of other-cell interference should be decreased is an issue.

Figure 2:
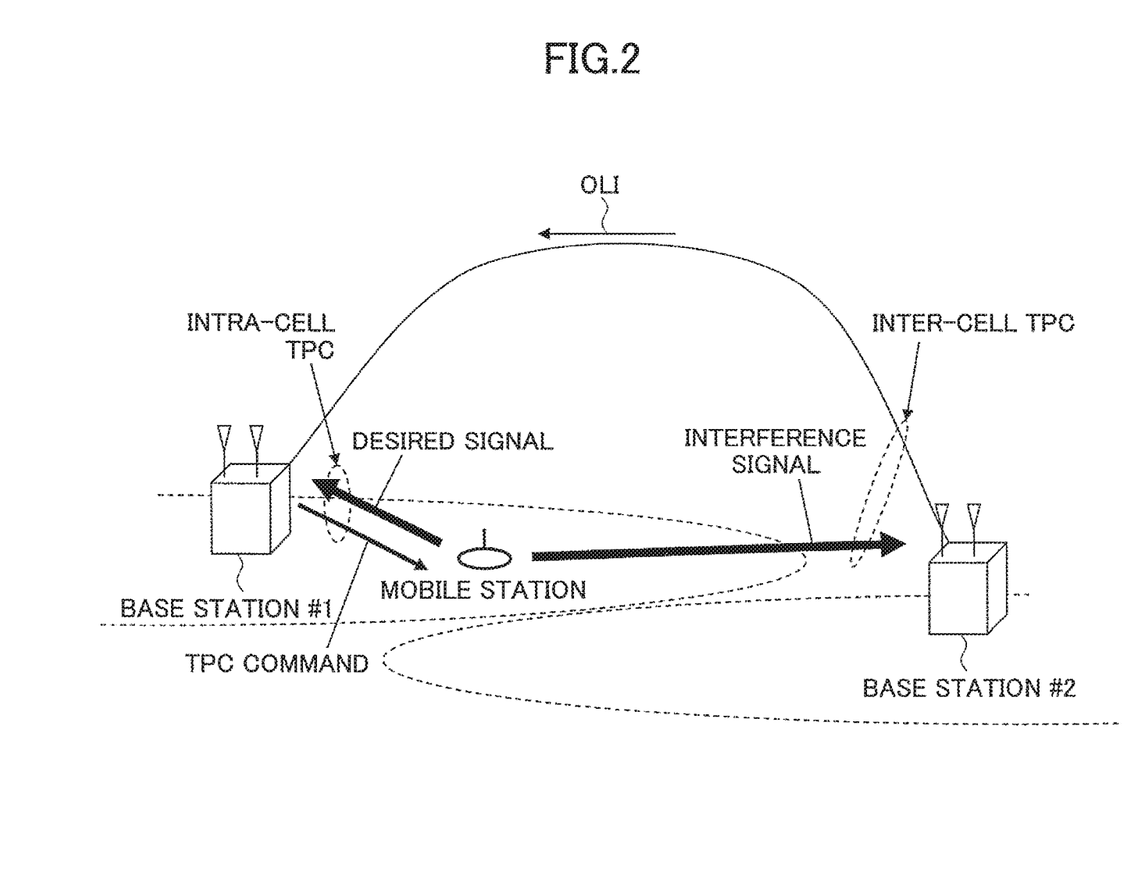
FIG. 2 is an explanatory diagram showing an example of transmission power control.

As a method for decreasing the other-cell interference, a method using a control signal called Overload Indicator (OLI) is adopted in HSUPA and E-UTRA (refer to non-patent document 2, for example). As shown in FIG. 2, each base station measures the uplink interference amount, and reports the interference amount to neighboring cells via a network using OLI. The base station receiving OLI from a neighboring cell causes a mobile station to decrease transmission power when it is determined that the interference amount exerted on the neighboring cell is large. Accordingly, the other-cell interference amount can be controlled, that is, can be decreased, for example, so that throughput characteristics of the whole system and user throughput characteristics can be improved.

[Non-patent document 1] 3GPP TR25.814 (V7.1.0), "Physical Layer Aspects for Evolved UTRA", September 2006.
[Non-patent document 2] 3GPP, TS 25.309, (V6.6.0), "FDD Enhanced Uplink Overall Description Stage 2," March 2006.

DISCLOSURE OF THE INVENTION

Problem to be Solved by the Invention

However, the above-mentioned background technique has the following problem.

In E-UTRA, different from HSUPA, time/frequency scheduling is applied as mentioned above. Thus, the other-cell interference amount varies for each TTI, and mobile stations which are assigned transmission vary for each RB. Therefore, the interference amount largely varies. Thus, in order to effectively control the other-cell interference amount, it is necessary to report OLI for each TTI in the time axis direction, and for each RB in the frequency axis direction. In E-UTRA, TTI is 1.0 msec. Thus, OLI needs to be reported 1000 times per one second. In addition, the number of RBs is 50, for example, in the case of a bandwidth of 10 MHz. Thus, 50 pieces of OLI information on RB need to be reported in this case. This causes large load not only for the network, but also for the base station apparatus which performs transmit and receive processing of OLI.

Therefore, in actuality, a method for lowering resolution of control is being studied. In the method, for example, OLI is reported based on an average interference amount every one second, instead of every TTI in the time axis direction. In the frequency axis direction, for example, OLI is reported based on an interference amount averaged in the whole band, instead of every RB.

However, in the control based on the average interference amount, there is a problem in that the other-cell interference amount cannot be effectively controlled in the E-UTRA uplink packet access in which interference amount largely varies every TTI and every RB.

In view of the above-mentioned problem, an object of the present invention is to provide a base station apparatus and a communication control method which can effectively control the other-cell interference amount based on a realistic control signal amount of the overload indicator by decreasing the control signal amount of the overload indicator while maintaining resolution of control in the time axis direction and the frequency axis direction.

Means for Solving the Problem

In order to overcome the above problem, one aspect of the present invention relates to a base station apparatus for performing time and frequency scheduling in uplink packet access, including:

an interference amount measurement part configured to measure an uplink interference amount for each interference amount measurement unit which comprises a predetermined period and a predetermined number of frequency blocks;

an interference amount determination part configured to determine whether the uplink interference amount satisfies a predetermined condition; and an overload indicator reporting part configured to report an overload indicator to a neighboring cell when the predetermined condition is satisfied.

Another aspect of the present invention relates to a communication control method in a base station apparatus for performing time and frequency scheduling in uplink packet access, including:

an interference amount measurement step of measuring an uplink interference amount for each interference amount measurement unit which comprises a predetermined period and a predetermined number of frequency blocks;

an interference amount determination step of determining whether the uplink interference amount satisfies a predetermined condition; and an overload indicator reporting step of reporting an overload indicator to a neighboring cell when the predetermined condition is satisfied.

Effect of the Present Invention

According to an embodiment of the present invention, a base station apparatus and a communication control method which can effectively control the other-cell interference amount based on a realistic control signal amount of the overload indicator can be realized by decreasing the control signal amount of the overload indicator while maintaining resolution of control in the time axis direction and the frequency axis direction.

DESCRIPTION OF REFERENCE SIGNS 50 ($50_1$, $50_2$) cell
100 ($100_1$, $100_2$, $100_3$, . . . $100n$) user apparatus
200 ($200_1$, $200_2$ . . . $200_1$) base station apparatus
202 radio part
204 other-cell interference measurement part
206 OLI transmission determination part
208 OLI transmission part
210 wired transmission line interface
212 reference value control part
214 reference value determination part
216 other-cell interference amount measurement unit control part
300 access gateway apparatus
400 core network
1000 radio communication system

PREFERRED EMBODIMENTS FOR CARRYING OUT THE INVENTION

In the following, embodiments of the present invention are described with reference to figures. In all of the figures for explaining embodiments, the same reference symbols are used for parts having the same function, and repeated descriptions are not given.

Figure 3:
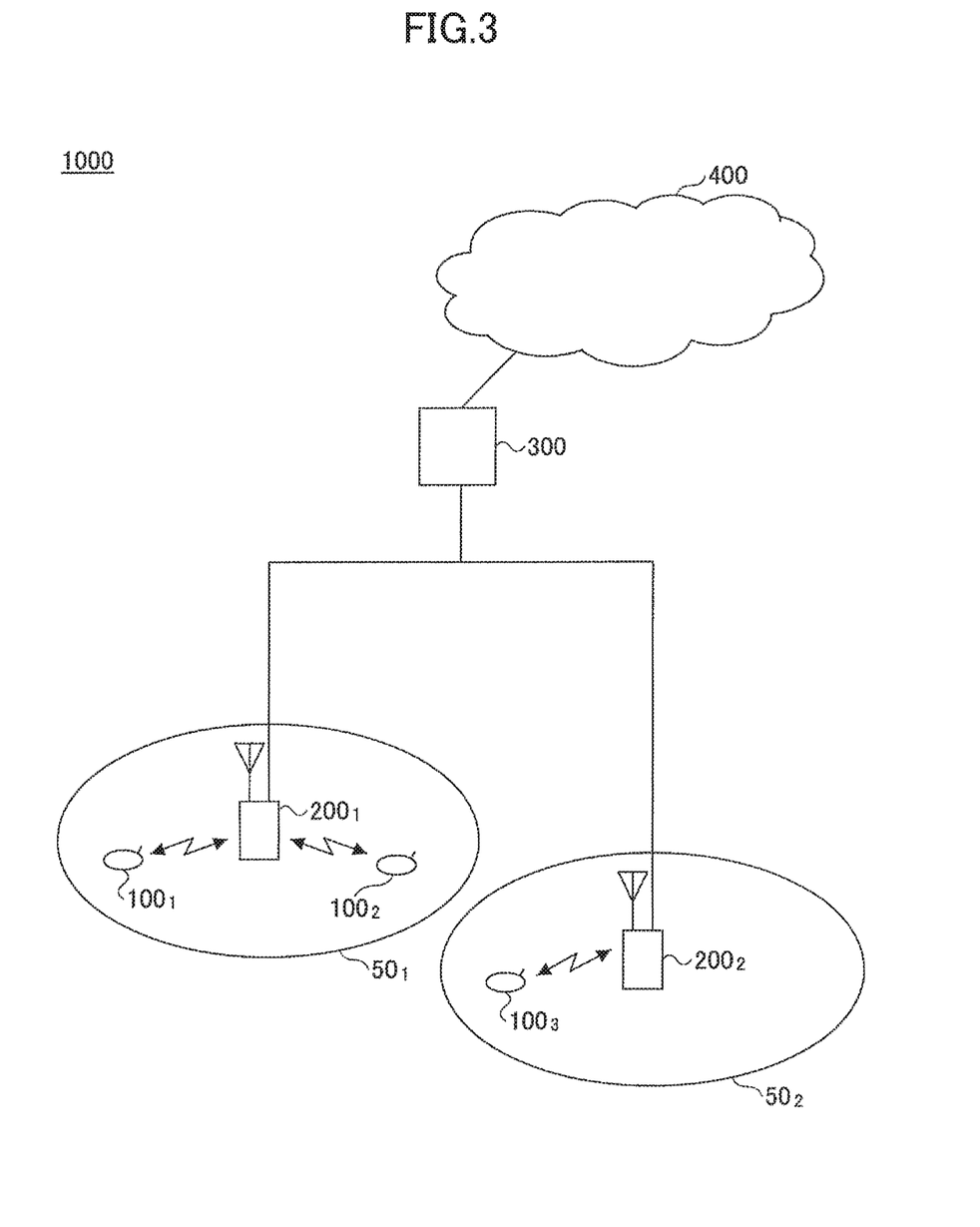
FIG. 3 is an explanatory diagram showing a radio communication system of an embodiment of the present invention.

A radio communication system including the mobile station and the base station apparatus of an embodiment of the present invention is described with reference to FIG. 3.

The radio communication system 1000 is a system to which E-UTRA is applied, for example. The radio communication system 1000 includes a base station apparatus (eNB: eNode B) 200 ($200_1$, $200_2$ . . . $200_l$, l is an integer of l>0) and a plurality of mobile stations $100n$ ($100_1$, $100_2$, $100_3$, . . . $100_n$, n is an integer and n>0). The base station apparatus 200 is connected to an upper station, that is, an access gateway apparatus 300, for example, and the access gateway apparatus 300 is connected to a core network 400. The mobile station $100_n$ is communicating with the base station apparatus 200 by E-UTRA in a cell 50 ($50_1$, $50_2$). In the present embodiment, two cells are shown, but, more than two cells can be applied.

In the following, since the mobile stations ($100_1$, $100_2$, $100_3$, . . . $100_n$) have the same configurations, functions and states, a mobile station $100_n$ is described unless otherwise mentioned. For the sake of convenience of explanation, although the entity which communicates with the base station apparatus by radio is the mobile station, it may be a user apparatus (UE: User Equipment) including a mobile terminal and a fixed terminal more generally.

As radio access schemes, the radio communication system 1000 uses OFDM (orthogonal frequency division multiplexing) in the downlink, and uses SC-FDMA (single carrier-frequency division multiple access) in the uplink. OFDM is a multi-carrier transmission scheme in which a frequency band is divided into a plurality of narrow frequency bands (subcarriers) so that transmission is performed by mapping data on each subcarrier. SC-FDMA is a single carrier transmission scheme that can decrease interference among terminals by dividing a frequency band for each terminal and by using different frequency bands with each other by a plurality of terminals.

In the following, communication channels in the E-UTRA are described.

In the downlink, the physical downlink shared channel (PDSCH) shared by each mobile station $100_n$ and the physical downlink control channel (PDCCH) are used. The physical downlink control channel is also called a downlink L1/L2 control channel. User data, that is, a normal data signal is transmitted by the physical downlink shared channel. Also, the physical downlink control channel transmits downlink (DL) scheduling information, acknowledgment information (ACK/NACK), uplink (UL) scheduling grant, overload indicator, transmission power control command and the like.

The DL scheduling information includes, for example, ID of a user performing communication using the physical downlink shared channel, information of transport format of the user data, that is, information related to data size, modulation scheme and HARQ, and includes assignment information of downlink resource blocks, and the like.

The UL scheduling grant includes, for example, ID of a user performing communication using the physical uplink shared channel, information of transport format of the user data, that is, information related to data size and modulation scheme, and includes assignment information of the uplink resource blocks, transmission power control command, and the like. The uplink resource block corresponds to frequency resources, and is also called a resource unit.

The acknowledgement information (ACK/NACK) is acknowledgement information on the uplink shared channel.

In the uplink, the physical uplink shared channel (PUSCH) shared by each mobile station $100_n$ and the physical uplink control channel are used. The physical uplink shared channel transmits user data, that is, the normal data signal. In addition, the physical uplink control channel transmits downlink quality information (CQI: Channel Quality Indicator) used for scheduling processing for the physical downlink shared channel and for the adaptive modulation and coding scheme (AMC), and transmits acknowledgment information of the physical downlink shared channel. The contents of the acknowledgment information are represented as either one of Acknowledgement (ACK) indicating that a transmission signal has been properly received or Negative Acknowledgement (NACK) indicating that the signal has not been properly received.

In addition to the CQI and the acknowledgement information, the physical uplink control channel may transmit a scheduling request requesting resource assignment of the uplink shared channel, resource request in persistent scheduling, and the like. The resource assignment of the uplink shared channel means that the base station apparatus reports, using the physical downlink control channel of a subframe, information to the mobile station indicating that the mobile station is permitted to perform communication using the uplink shared channel in a following subframe.

The mobile station $100_n$ communicates with an optimum base station apparatus. In the example shown in FIG. 3, mobile stations $100_1$ and $100_2$ communicates with a base station apparatus $200_1$, and a mobile station $100_3$ communicates with a base station apparatus $200_2$. In this case, uplink transmission by the mobile stations $100_1$ and $100_2$ becomes interference for the base station apparatus $200_2$ which forms a neighboring cell. As described before, the other-cell interference largely varies since the mobile station changes every TTI and every RB due to the uplink packet scheduling.

Thus, the base station apparatus $200_2$ measures an uplink interference amount, and sends an overload indicator (OLI) to the base station apparatus $200_1$ via a network for reporting state of the measured uplink interference amount. The base station apparatus $200_1$ that receives OLI from the base station apparatus $200_2$ determines transmission power for controlling transmission power of a communicating mobile station. That is, when the base station apparatus $200_2$ determines that an uplink interference amount from a mobile station (mobile station $100_1$ and/or $100_2$, for example) residing in a cell covered by a base station apparatus (base station apparatus $200_1$, for example) which covers a neighboring cell other than the base station apparatus $200_2$ is large, the base station apparatus $200_2$ transmits OLI to the base station apparatus $200_1$ in order to decrease transmission power of the mobile station $100_1$ and/or $100_2$.

Based on the OLI, the base station apparatus $200_1$ determines that the mobile stations $100_1$ and $100_2$ residing in the area covered by the base station apparatus $200_1$ exerts large interference on the base station apparatus $200_2$ other than the base station apparatus $200_1$, so that the base station apparatus $200_1$ causes the mobile station $100_1$ and/or $100_2$. to decrease the transmission power.

Figure 4:
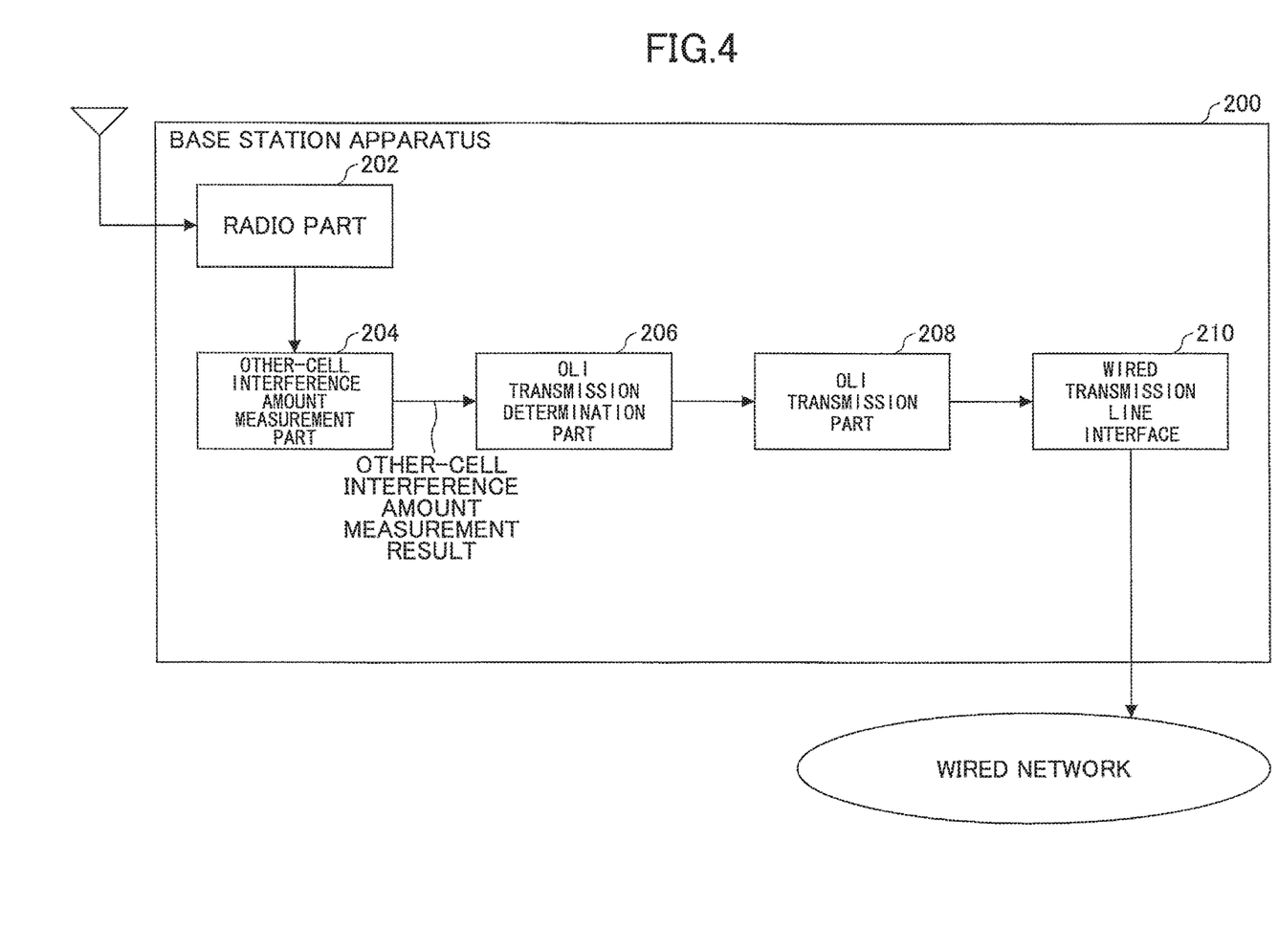
FIG. 4 is a partial block diagram showing a base station apparatus of an embodiment of the present invention.

The base station apparatus 200 of an embodiment of the present invention is described with reference to FIG. 4.

The base station apparatus 200 of the present embodiment includes a radio part 202, an other-cell interference amount measurement part 204 as an interference amount measurement part, an OLI transmission determination part 206 as an interference amount determination part, an OLI transmission part 208 as an overload indicator reporting part, and a wired transmission line interface 210. The wired transmission line interface is connected to a wired network.

When the base station apparatus 200 receives an uplink signal, which is the physical uplink shared channel, for example, the base station apparatus 200 performs reception processing in the radio part 202 so as to obtain a baseband signal. The received baseband signal is input to the other-cell interference amount measurement part 204, so that the other-cell interference amount measurement part 204 measures the other-cell interference amount. For example, an uplink signal is received from a mobile station apparatus residing in an area covered by a base station apparatus other than the own base station apparatus. The measurement of the interference amount is performed for each interference amount measurement period and for each interference amount measurement unit frequency block, that is, the measurement of the interference amount is performed every interference measurement unit. Typically, the measurement is performed every TTI and every RB. But, the measurement may be performed every multiple TTIs and/or every multiple RBs in consideration of a control signal amount and a processing load in the base station and the like. The other-cell interference amount measurement part 204 inputs the measured other-cell interference amount into the OLI transmission determination part 206.

The OLI transmission determination part 206 determines whether to send the OLI to a neighboring cell based on measurement result of the other-cell interference amount. For example, based on a reference value which is set beforehand, the OLI transmission determination part 206 determines to report OLI only when the other-cell interference amount in each interference amount measurement unit is equal to or greater than the reference value. The reference value is determined based on whether it is necessary, for a base station apparatus in a neighboring cell, to cause a subject interference station (for example, a residing mobile station) to decrease transmission power. For example, when the other-cell interference amount in each interference amount measurement unit is equal to or greater than the reference value, OLI indicating decreasing transmission power is transmitted to the neighboring cell. The neighboring cell performs control of transmission power based on the received OLI. In this case, the neighboring cell performs control to cause the residing mobile station to lower transmission power. Therefore, when other-cell interference amount in each interference amount measurement unit does not satisfy the reference value, it is determined that the base station apparatus of the neighboring cell does not need to consider OLI when determining transmission power of the mobile station, so that OLI is not transmitted.

When the OLI transmission determination part 206 determines to report OLI, the OLI transmission part 208 transmits OLI to the neighboring cell. As a result, OLI is reported to another base station apparatus via the wired transmission line interface 210 and the wired network. The other base station apparatus controls transmission power of the subject interference station based on the overload indicator transmitted from the neighboring cell.

Accordingly, the base station apparatus $200_2$ need not report OLI when it is determined that the base station apparatus $200_1$ does not need to consider OLI for determining transmission power of the residing mobile station. Therefore, transmission load of control signals in the network due to OLI, and load for OLI transmit and receive processing can be largely decreased in the base station apparatus.

Even though the system is configured as mentioned above, OLI is reported for an interference amount measurement unit that exerts large effect in which the other-cell interference amount in each interference amount measurement unit is equal to or greater than the reference value. Thus, the effect for control the other-cell interference amount can be sufficiently obtained.

In the present embodiment, an optimum value as a system parameter is set beforehand as the reference value used for determining whether to report OLI.

Figure 5:
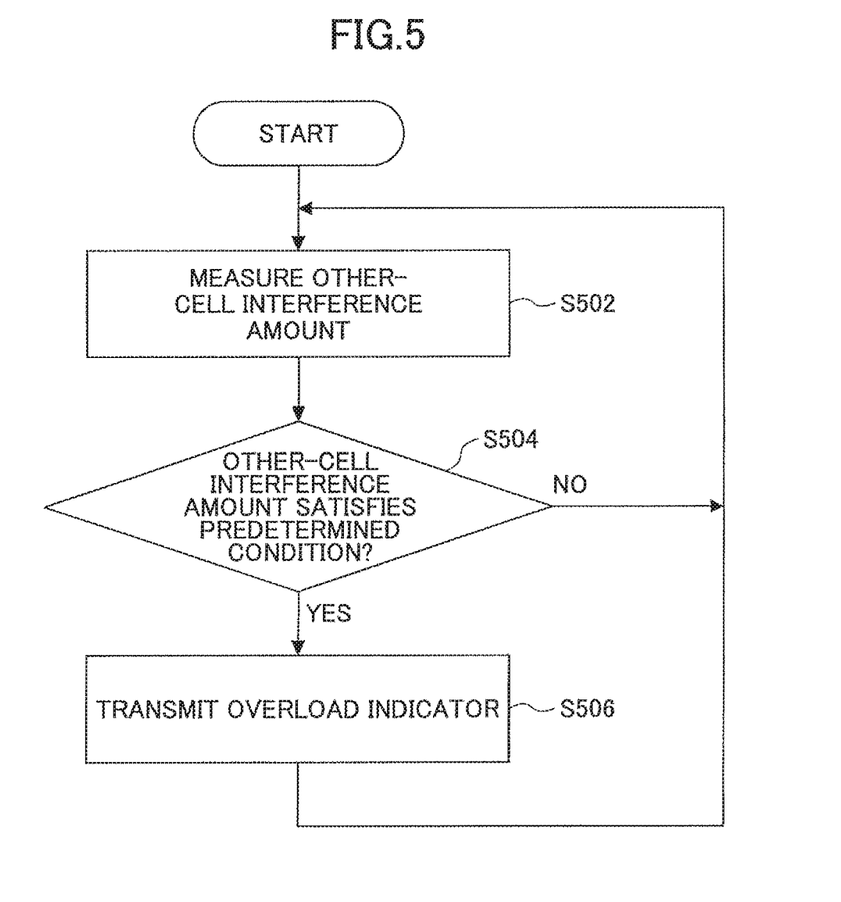
FIG. 5 is a flow diagram showing operation of the base station apparatus of an embodiment of the present invention.

Next, operation of the base station apparatus in the radio communication system in the present embodiment is described with reference to FIG. 5.

The base station apparatus receives an uplink signal from a mobile station apparatus residing in an area covered by a base station apparatus other than the own base station apparatus.

The other-cell interference amount measurement part 204 measures an other-cell interference amount based on the uplink signal (step S502).

The OLI transmission determination part 206 determines whether the other-cell interference amount measured in step S502 satisfies a predetermined condition (step S504). For example, it is determined whether the other-cell interference amount is equal to or greater than a predetermined reference value which is set beforehand.

When the other-cell interference amount satisfies the predetermined reference value (step S504: Yes), that is, when the other-cell interference amount is equal to or greater than a predetermined reference value that is set beforehand, for example, the OLI transmission control part 206 determines to transmit an overload indicator to a neighboring cell, and the OLI transmit part 208 transmits the overload indicator to the neighboring cell (step S506). After that, the process returns to step S502.

On the other hand, when the other-cell interference amount does not satisfy the predetermined reference value (step S504:NO), that is, when the other-cell interference amount is less than a predetermined reference value that is set beforehand, for example, the process returns to step S502.

Next, a radio communication system of another embodiment of the present invention is described.

The configuration of the radio communication system of the present embodiment is the same as the configuration of the radio communication system described with reference to FIG. 3.

Figure 6:
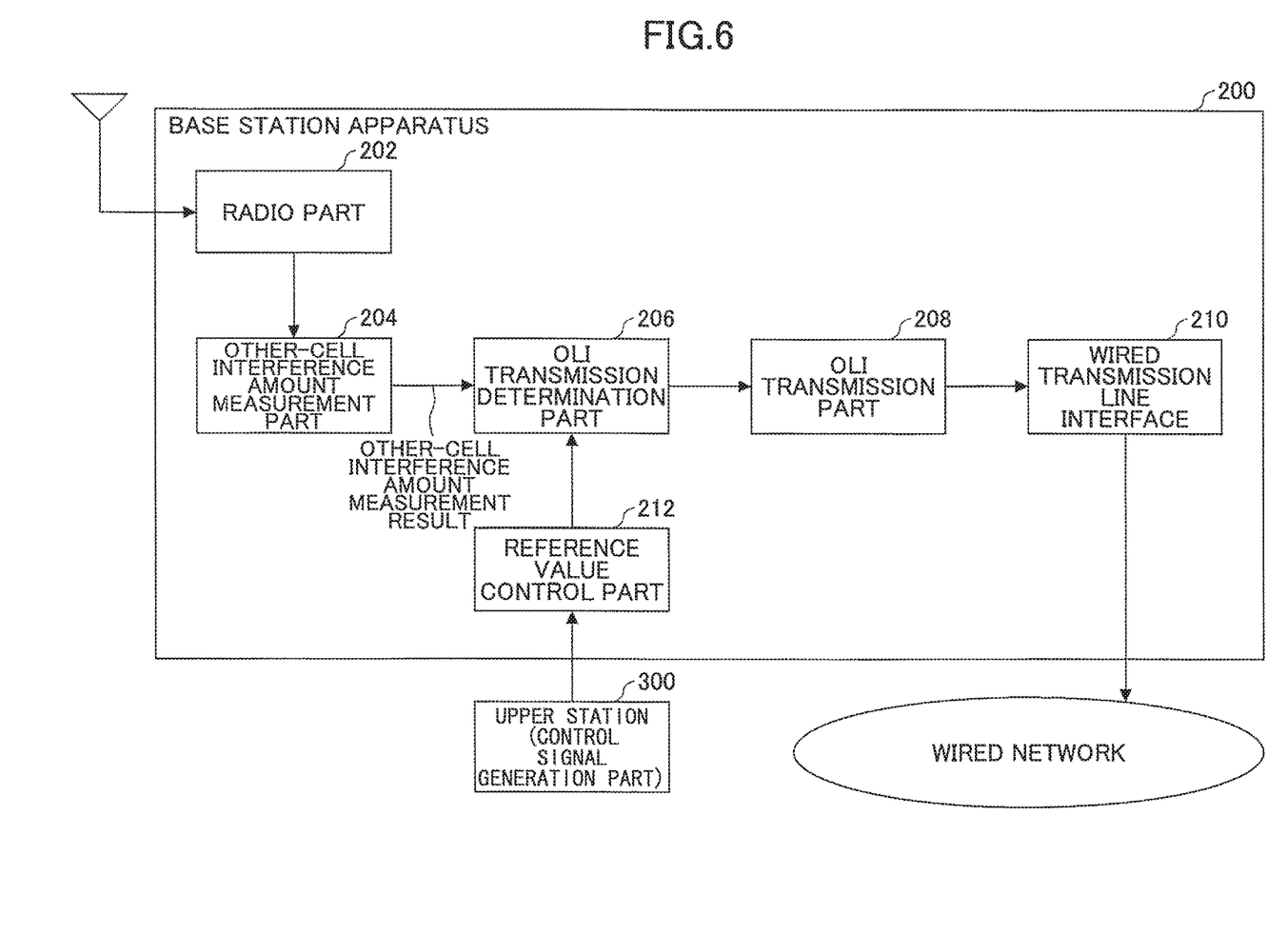
FIG. 6 is a partial block diagram showing the base station apparatus of an embodiment of the present invention.

The base station apparatus 200 of the present embodiment is described with reference to FIG. 6.

The base station apparatus 200 of the present embodiment includes a reference value control part 212 connected the OLI transmission determination part 206 in addition to components of the base station apparatus described with reference to FIG. 4. The reference value control part 212 receives a control signal from an upper station, for example, from the access gateway apparatus 300.

The upper station 300 generates a control signal based on a traffic state of the network and a state of the other-cell interference amount and the like, and transmits the generated control signal to each base station apparatus. The control signal transmitted by the upper station 300 is received by the base station apparatus 200, and is input into the reference value control part 212. The reference value control part 212 controls a reference value based on the input control signal. By performing such processes, the reference value used for determining whether to report OLI can be flexibly changed according to the traffic state of the network and the state of the other-cell interference amount and the like.

Next, a radio communication system of another embodiment of the present invention is described.

The configuration of the radio communication system of the present embodiment is similar to the configuration of the radio communication system described with reference to FIG. 3.

Figure 7:
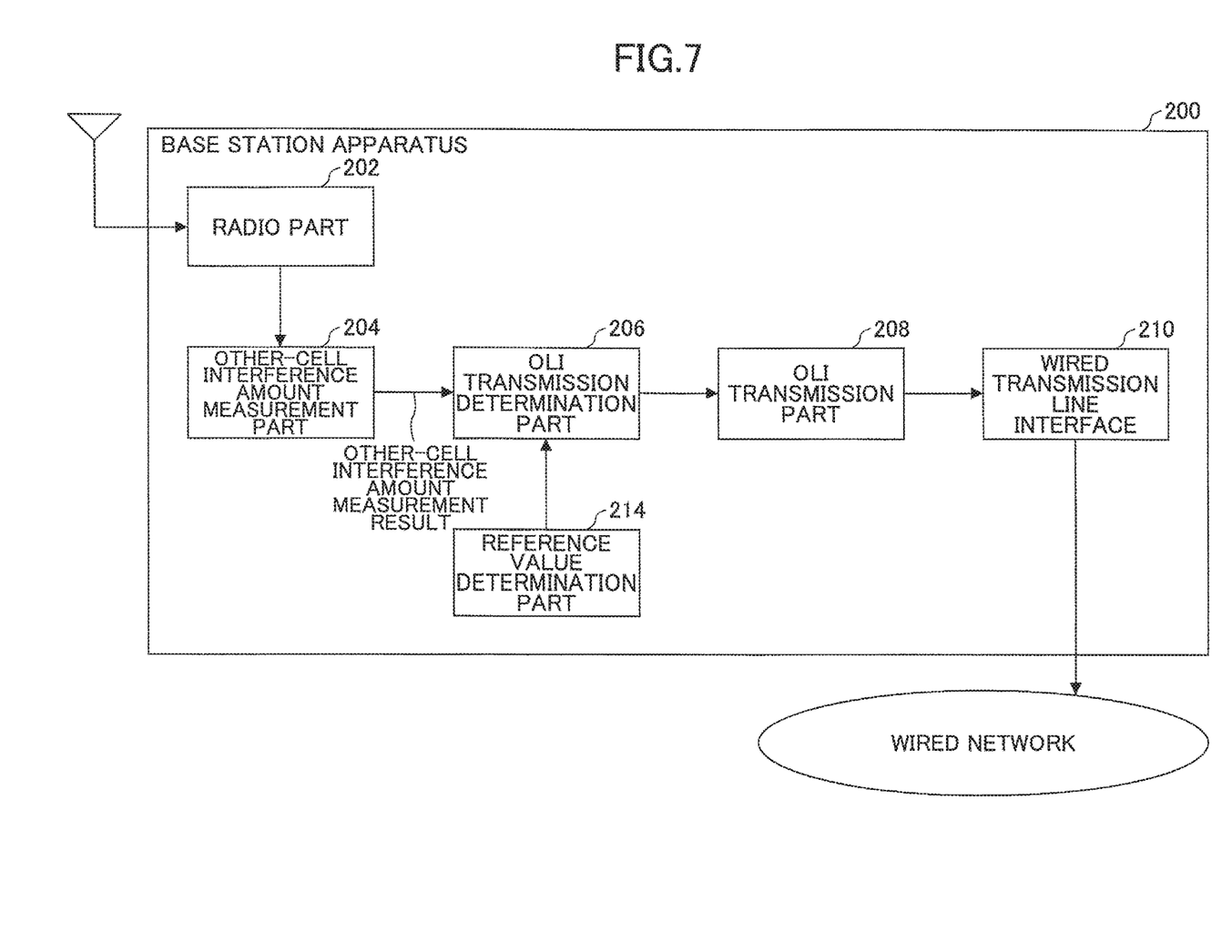
FIG. 7 is a partial block diagram showing the base station apparatus of an embodiment of the present invention.

The base station apparatus 200 according to the present embodiment is described with reference to FIG. 7.

The base station apparatus 200 of the present embodiment includes a reference value determination part 214 connected the OLI transmission determination part 206 in addition to components of the base station apparatus described with reference to FIG. 4. The reference value determination part 214 autonomously determines the reference value based on a traffic state of the network and a state of the other-cell interference amount and the like.

Based on the measurement result of the other-cell interference amount measured for each interference amount measurement unit, the reference value determination part 214 may determine a reference number N such that OLI is reported only for the top N (N is an integer of N>0) RBs in the other-cell interference amount from the largest one among RBs (frequency blocks) in a TTI. In this case, the OLI transmission determination part 206 determines to transmit OLI only for the top N RBs in the other-cell interference amount from the largest one among RBs in a TTI. Accordingly, OLI is transmitted to the base station apparatus $200_1$ for only RBs which exert large effect, and OLI for other RBs is not reported. Therefore, it becomes possible to largely reduce network transmission load for transmitting control signals due to OLI, and largely reduce load for OLI transmit and receive processing in the base station apparatus 200.

Even though the system is configured as mentioned above, OLI is reported for an interference amount measurement unit that exerts large effect in which the other-cell interference amount in each interference amount measurement unit is large. Thus, the effect for controlling the other-cell interference amount can be sufficiently obtained.

In addition, the reference value determination part 214 may set a reference value and a reference number N, such that, in each interference amount measurement unit, OLI is reported for only the top N (N is an integer of N>0) RBs in the other-cell interference amount among RBs in which the other-cell interference amount is equal to or greater than the reference value. Accordingly, when there are many interference amount measurement units in which the other-cell interference amount becomes equal to or greater than the reference value, the interference amount measurement units for which OLI is reported can be limited to the top reference number N. Therefore, it becomes possible to largely reduce network transmission load for transmitting control signals due to OLI, and reduce load for OLI transmit and receive processing in the base station apparatus 200.

Even though the system is configured as mentioned above, OLI is reported for an interference amount measurement unit that exerts large effect in which the other-cell interference amount in each interference amount measurement unit is equal to or greater than the reference value. Thus, the effect for controlling the other-cell interference amount can be sufficiently obtained.

Next, a radio communication system of another embodiment of the present invention is described.

The configuration of the radio communication system of the present embodiment is similar to the configuration of the radio communication system described with reference to FIG. 3.

Figure 8:
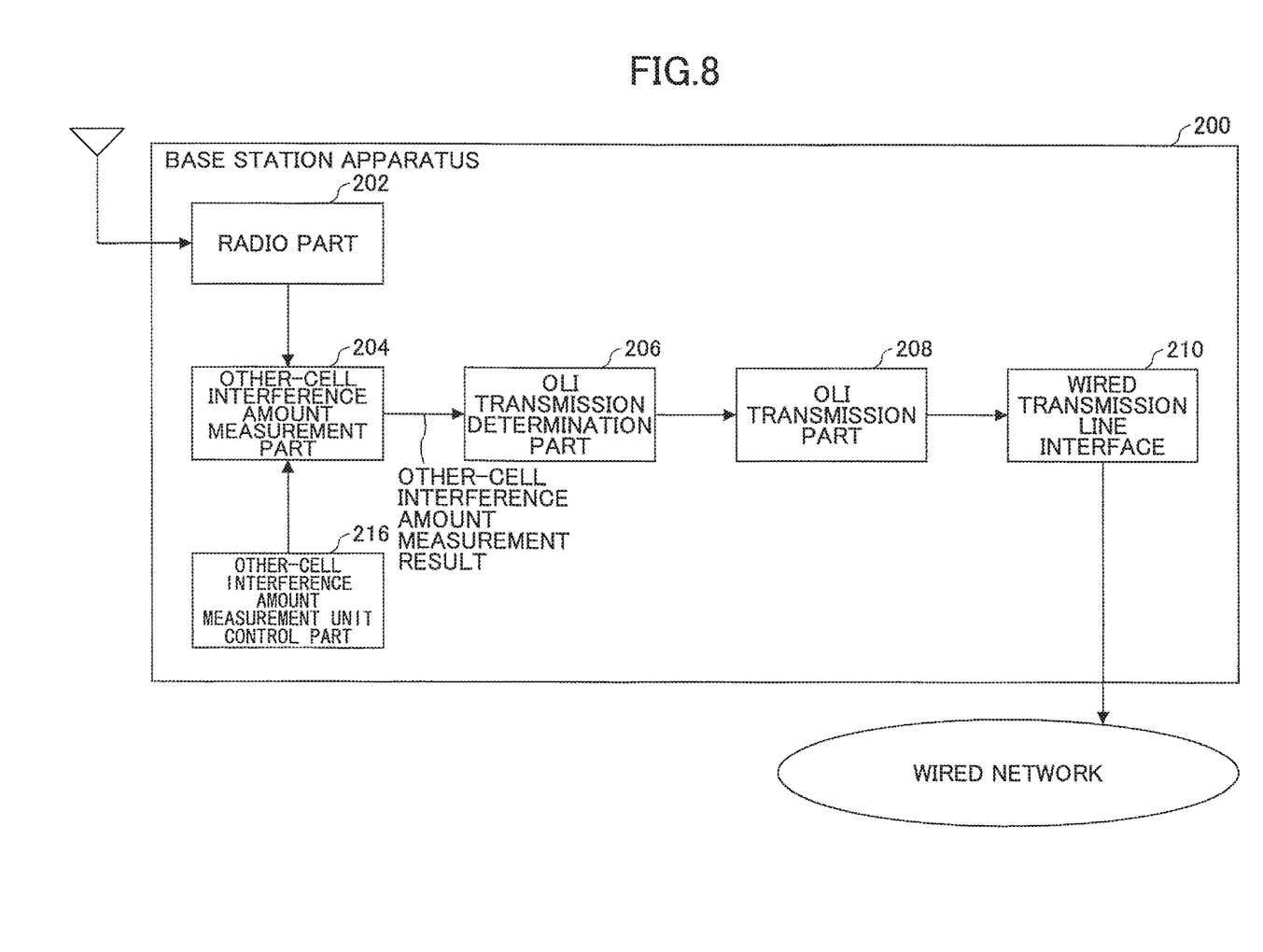
FIG. 8 is a partial block diagram showing the base station apparatus of an embodiment of the present invention.

The base station apparatus 200 according to the present embodiment is described with reference to FIG. 8.

The base station apparatus 200 of the present embodiment includes an other-cell interference amount measurement unit control part 216 connected the other-cell interference amount measurement part 204 in addition to components of the base station apparatus described with reference to FIG. 4.

The other-cell interference amount measurement unit control part 216 changes time unit and/or frequency block unit for measuring the interference amount, that is, the other-cell interference amount measurement unit control part 216 changes the interference amount measurement unit (OLI reporting unit). An optimum value as a system parameter may be set beforehand as the interference amount measurement unit value.

Next, a radio communication system of another embodiment of the present invention is described.

The configuration of the radio communication system of the present embodiment is similar to the configuration of the radio communication system described with reference to FIG. 3.

Figure 9:
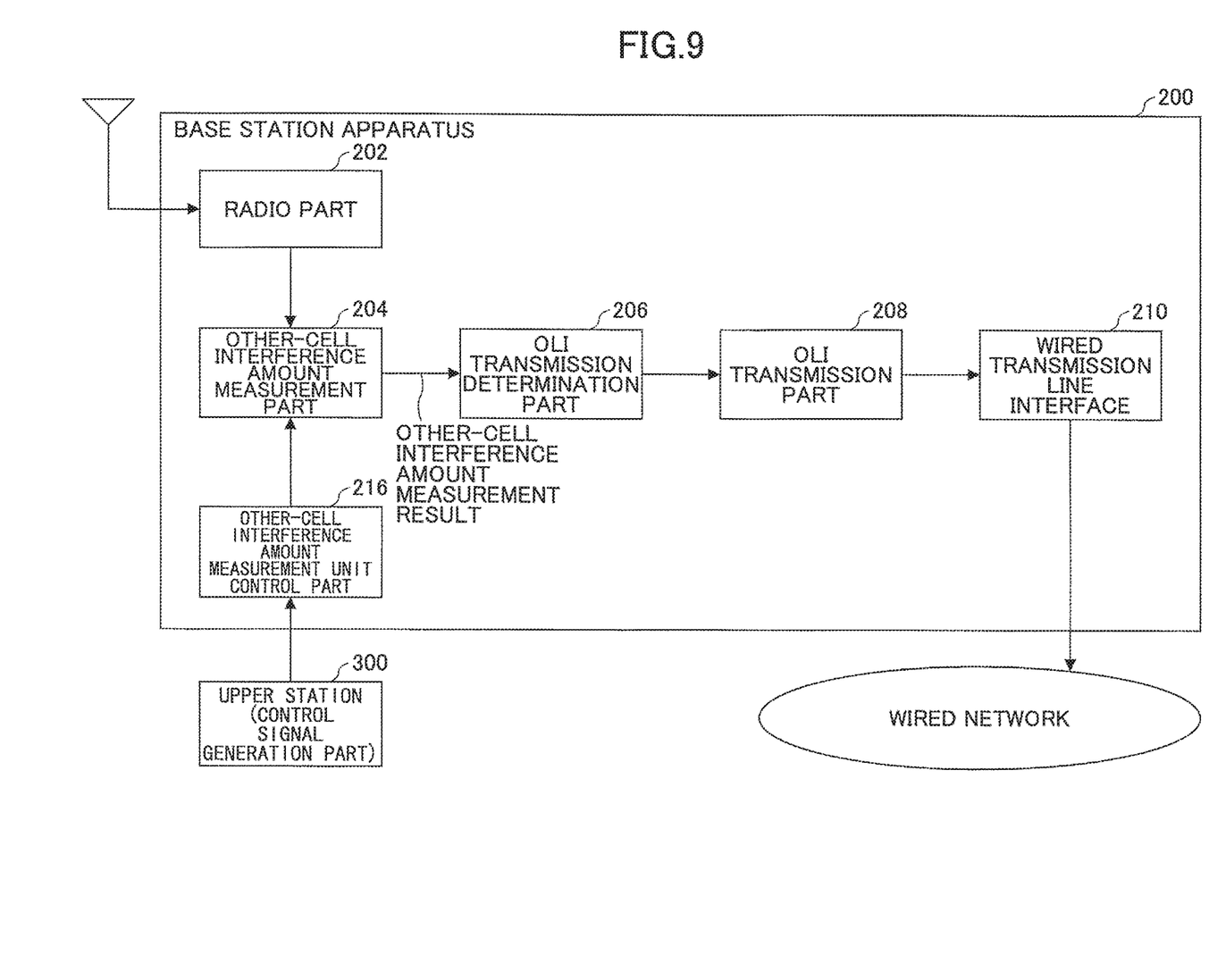
FIG. 9 is a partial block diagram showing the base station apparatus of an embodiment of the present invention.

The base station apparatus 200 according to the present embodiment is described with reference to FIG. 9.

The base station apparatus 200 of the present embodiment is configured such that the other-cell interference amount measurement unit control part 216 receives a control signal from an upper station, that is, from the access gateway apparatus 300, for example, in the base station apparatus described with reference to FIG. 8.

The upper station 300 generates the control signal based on a traffic state of the network and a state of the other-cell interference amount, and transmits the generated control signal to each base station. Based on the control signal transmitted from the upper station 300, the other-cell interference amount measurement unit control part 216 controls the interference amount measurement unit. In addition, the other-cell interference amount measurement unit control part 216 may autonomously control the interference amount measurement unit based on the traffic state of the network and the state of the other-cell interference amount and the like.

For the sake of convenience of explanation, the present invention is described by using some embodiments. But, classification into each embodiment is not essential in the present invention, and equal to or more than two embodiments may be used as necessary. While specific numerical value examples are used to facilitate understanding of the present invention, such numerical values are merely examples, so that any appropriate value may be used unless specified otherwise.

As described above, while the present invention is described with reference to specific embodiments, the respective embodiments are merely exemplary, so that a skilled person will understand variations, modifications, alternatives, and replacements. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese patent application No. 2007-126036, filed in the JPO on May 10, 2007, and the entire contents of the Japanese patent application No. 2007-126036 is incorporated herein by reference.

The invention claimed is:

1. An eNode B comprising:
at least one memory storing instructions, and
at least one processor configured to execute the instructions to:
detect uplink interference conditions, and
in a case of a variation in the uplink interference conditions, transmit, through an interface between the eNode B and a neighboring eNode B, an indication, wherein the indication includes an overload indicator per resource block and wherein the resource block comprises one time slot and at least one subcarrier in a single carrier FDMA communication system.

2. The eNode B according to claim 1, wherein the at least one processor is further configured to execute the instructions to allocate at least one resource block to a mobile station based on the indication.

3. The eNode B according to claim 1, wherein the indication indicates whether an interference level per a resource block is high or not.

4. The eNode B according to claim 1, wherein the indication identifies at least one of
a resource block indicating a high interference level, and
a resource block indicating a low interference level.

5. The eNode B according to claim 1, wherein the indication indicates an uplink interference level experienced by a cell.

6. The eNode B according to claim 1, wherein the at least one processor is further configured to execute the instructions to receive an uplink data via a physical uplink shared channel (PUSCH).

7. A method for an eNode B, the method comprising:
detecting uplink interference conditions, and
in a case of a variation in the uplink interference conditions, transmitting, through an interface between the eNode B and a neighboring eNode B, an indication, wherein the indication includes an overload indicator per resource block and wherein the resource block comprises one time slot and at least one subcarrier in a single carrier FDMA communication system.

8. The method according to claim 7, further comprising:
allocating at least one resource block to a mobile station based on the indication.

9. The method according to claim 7, wherein the indication indicates whether an interference level per a resource block is high or not.

10. The method according to claim 7, wherein the indication identifies at least one of
a resource block indicating a high interference level, and
a resource block indicating a low interference level.

11. The method according to claim 7, wherein
the indication indicates an uplink interference level experienced by a cell.

12. The method according to claim 7, further comprising:
receiving an uplink data via a physical uplink shared channel (PUSCH).

13. A user equipment comprising: at least one memory storing instructions, and at least one processor configured to execute the instructions to:
communicate with an eNode B which is configured to transmit an indication, wherein the indication includes an overload indicator per resource block, to a neighboring eNode B in a case of a variation in uplink interference conditions, through an interface between the eNode B and the neighboring eNode B;
wherein the resource block comprises one time slot and at least one subcarrier in a single carrier FDMA communication system.

14. The user equipment according to claim 13, wherein the indication indicates whether an interference level per a resource block is high or not.

15. The user equipment according to claim 13, wherein the indication comprises at least one of
a resource block indicating a high interference level, and
a resource block indicating a low interference level.

16. The user equipment according to claim 13, wherein the indication indicates an uplink interference level experienced by a cell.

17. The user equipment according to claim 13, wherein the at least one processor is further configured to execute the instructions to transmit an uplink data via a physical uplink shared channel (PUSCH) to the eNode B.

18. The user equipment according to claim 13, wherein the at least one processor is further configured to execute the instructions to receive information related to an allocation for uplink transmission via a physical downlink control channel (PDCCH).

* * * * *